United States Patent
Zheng et al.

(10) Patent No.: US 10,753,270 B2
(45) Date of Patent: Aug. 25, 2020

(54) CONTROLLING AN ELECTRONICALLY-ASSISTED TURBOCHARGER

(71) Applicant: Calnetix Technologies, LLC, Cerritos, CA (US)

(72) Inventors: Liping Zheng, Buena Park, CA (US); Suratkal P. Shenoy, Mission Viejo, CA (US); Co Si Huynh, Brea, CA (US)

(73) Assignee: Calnetix Technologies, LLC, Cerritos, CA (US)

( * ) Notice: Subject to any disclaimer, the term of this patent is extended or adjusted under 35 U.S.C. 154(b) by 0 days.

(21) Appl. No.: 16/053,326

(22) Filed: Aug. 2, 2018

(65) Prior Publication Data
US 2020/0040811 A1    Feb. 6, 2020

(51) Int. Cl.
| F02B 37/14 | (2006.01) |
| F02B 39/10 | (2006.01) |
| F02D 41/00 | (2006.01) |
| H02P 6/18  | (2016.01) |

(52) U.S. Cl.
CPC ............. *F02B 37/14* (2013.01); *F02B 39/10* (2013.01); *F02D 41/0007* (2013.01); *H02P 6/188* (2013.01)

(58) Field of Classification Search
CPC ...... F02B 39/10; F02B 37/14; F02D 41/0007; H02P 6/188
See application file for complete search history.

(56) References Cited

U.S. PATENT DOCUMENTS
2018/0163675 A1*  6/2018  Oshita ............... F02B 37/04

FOREIGN PATENT DOCUMENTS
| CN | 105915141 | 8/2016 |
| JP | 2007-116768 | 5/2007 |

OTHER PUBLICATIONS
Extended European Search Report issued in European Application No. 19189445.0 dated Dec. 5, 2019, 9 pages.
Bradshaw et al., "Bit-stream implementation of a phase-locked loop." IET power electronics 4.1, Jan. 1, 2011, 10 pages.

\* cited by examiner

*Primary Examiner* — Brandon D Lee
(74) *Attorney, Agent, or Firm* — Fish & Richardson P.C.

(57) ABSTRACT

A first line-to-line terminal voltage of a three-phase electric motor is measured while the three-phase electric motor free-spins. A second line-to-line terminal voltage of a three-phase electric motor is measured while the three-phase electric motor free-spins. A motor's rotor position is determined based on the first line-to-line terminal voltage and the second line-to-line terminal voltage. Three-phase current is sent to the motor after the rotor position has been determined. The three-phase current being in-phase with the rotor position.

13 Claims, 3 Drawing Sheets

CONTROLLING AN ELECTRONICALLY-ASSISTED TURBOCHARGER

TECHNICAL FIELD

This disclosure relates to controlling electrical machines, particularly motor generator units (MGUs) used in turbochargers for boosting and energy recovery.

BACKGROUND

In automotive and marine systems, turbochargers are used to increase the power output of internal combustion engines. Turbochargers are powered by a turbine within the exhaust manifold of the internal combustion engine. The turbine turns a compressor that increases the pressure and total air flow within the intake manifold. Due to inertia of the rotating components and inefficiencies in the turbine, there is a delay between the pressure supplied to the intake manifold and the pressure needed in the intake manifold due to engine load. Such a delay is often referred to as turbo lag. To counteract turbo lag, some turbochargers include an electrical machine that functions as a booster motor to accelerate the compressor and turbine to a desired speed quicker than the turbo would accelerate on its own. Besides boosting, the electrical machine can also functions as a generator to recover excess exhaust energy from the engine.

SUMMARY

This disclosure describes technologies relating to controlling an electronically-assisted turbocharger.

An example implementation of the subject matter described within this disclosure is a method of controlling an electrically assisted turbocharger with the following features. A first line-to-line terminal voltage of a three-phase electric motor is measured while the three-phase electric motor free-spins. A second line-to-line terminal voltage of a three-phase electric motor is measured while the three-phase electric motor free-spins. A motor's rotor position is determined based on the first line-to-line terminal voltage and the second line-to-line terminal voltage. Three-phase current is sent to the motor after the rotor position has been determined. The three-phase current being in-phase with the rotor position.

Aspects of the example implementation, which can be combined with the example implementation alone or in combination, include the following. The motor is a permanent magnet synchronous motor.

Aspects of the example implementation, which can be combined with the example implementation alone or in combination, include the following. Sending three-phase current to the motor comprises approximating a sine wave with pulse width modulation.

Aspects of the example implementation, which can be combined with the example implementation alone or in combination, include the following. The motor is accelerated to a pre-set speed.

Aspects of the example implementation, which can be combined with the example implementation alone or in combination, include the following. The motor is coupled to or integrated in a turbocharger. The turbocharger is accelerated to the pre-set speed.

Aspects of the example implementation, which can be combined with the example implementation alone or in combination, include the following. The motor is allowed to free-spin once the pre-set speed is reached.

Aspects of the example implementation, which can be combined with the example implementation alone or in combination, include the following. Determining the motor position includes using the following equations:

$$Vds = 1/\sqrt{3}(Vc-Vb)$$

$$V_{qs} = -(V_b+V_c)$$

where $V_b$ is the first line-to-line terminal voltage, $V_c$ is the second line-to-line terminal voltage, $V_{ds}$ is a first orthogonal component, and $V_{qs}$ is a second orthogonal component.

Aspects of the example implementation, which can be combined with the example implementation alone or in combination, include the following. Determining the motor's rotor position includes using the following equations:

$$V_{qr} = V_{qs}\cos\theta - V_{ds}\sin\theta$$

$$V_{dr} = V_{qs}\sin\theta - V_{ds}\cos\theta$$

where $V_{qr}$ is a first rotating frame reference voltage, $V_{dr}$ is second rotating frame reference voltage, and $\theta$ is the rotor position.

Aspects of the example implementation, which can be combined with the example implementation alone or in combination, include the following. Determining the rotor position includes using a phase lock loop to generate a voltage phase angle.

Aspects of the example implementation, which can be combined with the example implementation alone or in combination, include the following. Using the phase lock loop includes regulating $V_{dr}$ to zero volts.

An example implementation of the subject matter described within this disclosure is an electric motor control system with the following features. A three-phase electric machine is configured to drive or be driven by a rotating device. A variable speed drive is electrically coupled to the electrical machine. The variable speed drive is configured to drive the electric machine with three phases of current. A first voltage sensor is configured to measure a first line-to-line terminal voltage of the three-phase electric machine while the three-phase electric machine free-spins. A second voltage sensor is configured to measure a second line-to-line terminal voltage of the three-phase electric machine while the three-phase electric machine free-spins. A controller is configured to receive the first line-to-line terminal voltage and the second line-to-line terminal voltage. The controller is configured to determine the rotor position of the three-phase electric machine. The controller is configured to send three-phase power to the three-phase electric machine after the three-phase electric machine's rotor position has been determined. The three phase power being in-phase with the three-phase electric machine's rotor position.

Aspects of the example implementation, which can be combined with the example implementation alone or in combination, include the following. The rotating device includes a turbocharger.

Aspects of the example implementation, which can be combined with the example implementation alone or in combination, include the following. The controller includes one or more processors and a non-transitory computer-readable storage medium coupled to the one or more processors that stores programming instructions for execution by the one or more processors. The programming instructions executable by the one or more processors includes determining the position based on the first line-to-line terminal voltage and the second line-to-line terminal voltage.

Aspects of the example implementation, which can be combined with the example implementation alone or in combination, include the following. The programming instructions executable by the one or more processors to determine the position include instructions executable by the one or more processors to compute a Clarke transform and a Park transform.

Aspects of the example implementation, which can be combined with the example implementation alone or in combination, include the following. The electric machine is a synchronous permanent magnet electric machine.

An example implementation of the subject matter described with this disclosure is an electrically boosted turbocharger system with the following features. A turbocharger is configured to increase an intake manifold pressure of an internal combustion engine. The turbocharger includes a compressor configured to increase the intake manifold pressure, and a turbine rotatably coupled to the compressor. The turbine is configured to convert exhaust flow into rotational motion. The turbine is configured to rotate the compressor. A three-phase electric motor is rotatably coupled to the turbocharger. The motor is configured to accelerate the turbocharger to a pre-set speed. A variable speed drive is electrically coupled to the motor. The variable speed drive is configured to drive the electric motor with three phases of current. The variable speed drive is configured to exchange current with the electric motor when the electric motor is accelerating. A first voltage sensor is configured to measure a first line-to-line terminal voltage of the three-phase electric motor while the three-phase electric motor free-spins. A second voltage sensor is configured to measure a second line-to-line terminal voltage of the three-phase electric motor while the three-phase electric motor free-spins.

Aspects of the example implementation, which can be combined with the example implementation alone or in combination, include the following. The electric motor is directly coupled to the compressor.

Aspects of the example implementation, which can be combined with the example implementation alone or in combination, include the following. The electric motor is a synchronous permanent magnet motor.

Aspects of the example implementation, which can be combined with the example implementation alone or in combination, include the following. The variable speed drive is configured to approximate a sine wave with pulse width modulation.

Aspects of the example implementation, which can be combined with the example implementation alone or in combination, include the following. The electrically boosted turbocharger system includes a controller with one or more processors and a non-transitory computer-readable storage medium coupled to the one or more processors that stores programming instructions for execution by the one or more processors. The programming instructions executable by the one or more processors include instructions to determine a motor position based on the first line-to-line terminal voltage or the second line-to-line terminal voltage.

Aspects of the example implementation, which can be combined with the example implementation alone or in combination, include the following. The programming instructions to instruct the one or more processors to determine a motor's rotor position include computing a Clarke transform or a Park transform.

Aspects of the example implementation, which can be combined with the example implementation alone or in combination, include the following. The variable speed drive is in an inactive state when the motor's rotor position is determined.

Aspects of the example implementation, which can be combined with the example implementation alone or in combination, include the following. The electric motor is configured to free-spin once the turbocharger has reached the pre-set speed.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Electronically boosted turbochargers require a significant amount of power to accelerate the turbocharger, for example, up to ten kilowatts for a typical passenger automobile application. When a variable speed drive (VSD) and motor are used to electronically boost the turbocharger, the variable speed drive is often active and powered even after the turbocharger is up to speed. Keeping the VSD powered is useful during variable load situations, such as high traffic situations, where the turbocharger will be frequently accelerating and decelerating. VSD power consumption can be as high as several hundred watts during idling condition when pulse width modulations (PWM) is required to keep switching at high switching frequency in order to know the real time rotor position information. Since the VSD is in idling condition frequently, such a power consumption reduces the overall system efficiency. In addition, keeping VSD active will also induce additional losses in the motor. While keeping the VSD active draws significant power from the electrical system, it can be necessary in some systems to constantly determine the rotor position of the motor. Such information is necessary for the function of a VSD. In particular, the current from VSD needs to be in phase with the rotor position of the motor. If the phasing between the VSD and the motor is off, then inefficiencies, overheating, and other undesirable results can occur.

This disclosure relates to an electronically boosted turbocharger system that senses a rotor position of the motor without keeping the VSD active, saving significant electrical energy. The system works by allowing the motor to free spin. That is, the VSD is in an off-state. In instances where a three-phase motor is used as the electronic booster, two voltage sensors are coupled to measure two line-to-line voltages of the three motor phases. A controller determines a rotor position during freewheeling using a Clarke transform and/or a Park transform. The VSD is activated only when the motor is accelerating the turbocharger. In some implementations, the VSD is configured to approximate a sine wave with PWM switching circuitry. By using the subject matter disclosed herein, an electronic booster can have a fast response to the speed demand while still maintaining high efficiency by keeping the VSD PWM switching off when the assistance is not needed.

Figure 1:
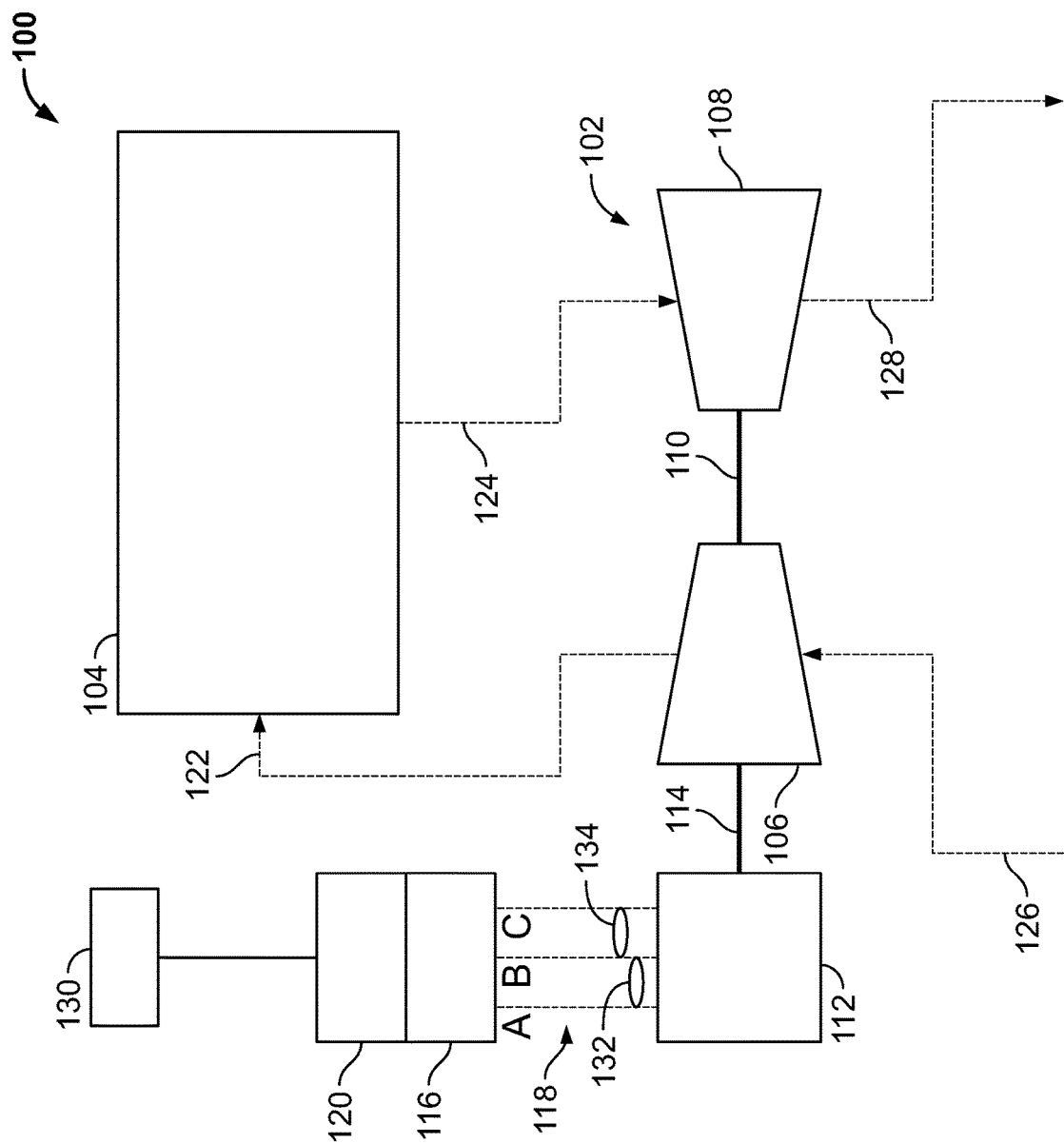
FIG. 1 is a schematic diagram of an example electronically boosted turbocharger system.

FIG. 1 is a schematic diagram of an example electronically boosted turbocharger system 100. A turbocharger 102 is configured to increase an intake manifold pressure of an internal combustion engine 104. The turbocharger 102 includes a compressor 106 configured to take in outside air from an air inlet 126 and to use the air to pressurize the intake manifold 122. The turbocharger 102 also includes a turbine 108 that is rotatably coupled to the compressor 106. The turbine 108 is configured to convert exhaust flowing through the exhaust header 124 into rotational motion and to rotate the compressor 106 via the turbo shaft 110. After passing through the turbine 108, the exhaust gas flows through the remaining exhaust system 128.

A three-phase electric motor 112 is rotatably coupled to the turbocharger 102 by a second shaft 114. The electric motor 112 is configured to drive and/or be driven by the turbocharger 102. The electric motor 112 is configured to accelerate the turbocharger to a pre-set speed, for example, from 50,000 to 170,000 rotations per minute (RPM). The electric motor 112 is configured to free-spin once the turbocharger 102 has reached the pre-set speed.

A VSD 116 is electrically coupled to the electric motor 112. The VSD 116 is configured to drive the electric motor 112 with three phases 118 of current. The VSD draws power from a power supply 130. The power supply 130 can include a vehicular electrical system. In some implementations, each phase of current is a sine wave. In some implementations, each phase of current is a trapezoidal wave. The VSD 116 exchanges current with the electric motor 112 when the electric motor 112 is accelerating. A first voltage sensor 132 is configured to measure a first line-to-line terminal voltage, for example, between the A phase and the B phase, of the electric motor 112 while the electric motor 112 free-spins. A second voltage sensor 134 is configured to measure a second line-to-line terminal voltage, for example, between the B phase and the C phase of the electric motor 112 while the electric motor 112 free-spins. A controller 120 is configured to receive the first voltage and the second voltage from their respective sensors. The controller 120 is configured to determine a rotor position of the electric motor 112 and to send three-phase power to the electric motor 112 via the VSD after the rotor position has been determined. In the context of this disclosure, the motor's rotor position is defined as the phase angle of the rotor within the stator. The variable speed drive is in an inactive state when the rotor position is determined. That is, the VSD is not drawing power from the power supply 130 when the rotor position is being determined, but the controller 120 is drawing power from the power supply 130. The controller 120 draws less power from the power supply 130 when the controller 120 is in an active state than the VSD 116 when the VSD 116 is in an active state. The three-phase power that is sent to the motor, after the position is determined, is in-phase with the electric motor 112 position. In some implementations, the VSD is configured to approximate a sine wave with PWM.

While described as driving a turbocharger 102, the motor control system described within this disclosure can be applied to other applications. In some implementations, the electric motor 112 is a synchronous permanent magnet electric motor. While described with a synchronous permanent magnet motor, other motor types, such as a brushless DC motor, can be used without departing from this disclosure. As described, the electric motor 112 is directly coupled to the compressor 106. In some implementations, the electric motor can be coupled directly to the turbine 108. In some implementations, a gearbox or other transmission system can be positioned between the electric motor 112 and the turbocharger 102.

Figure 2:
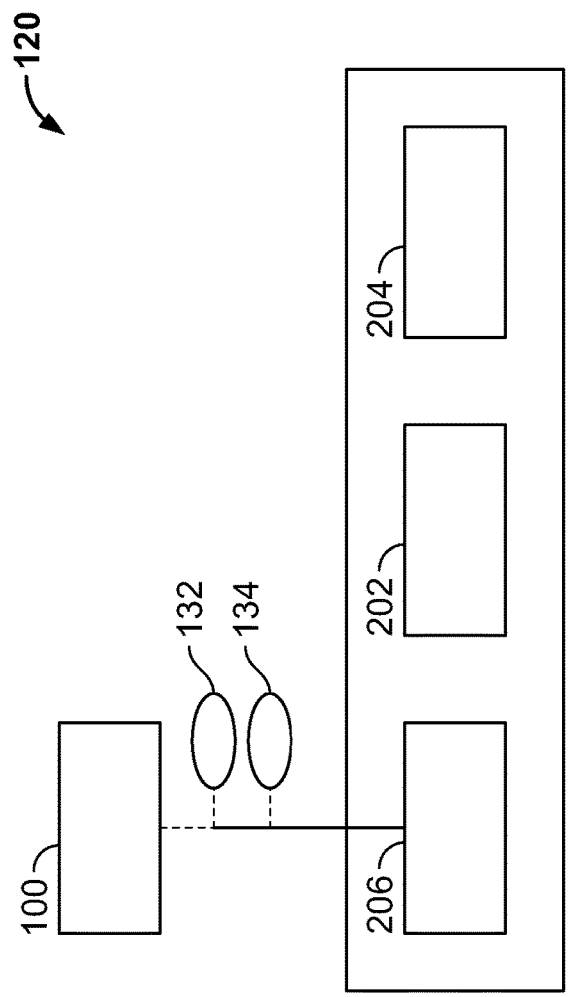
FIG. 2 is a schematic diagram of an example controller that can be used with aspects of this disclosure.

FIG. 2 is a schematic diagram of an example controller 120 that can be used with aspects of this disclosure. The controller 120 includes one or more processors 202 and a non-transitory computer-readable storage medium 204 coupled to the one or more processors 202. The non-transitory computer-readable storage medium 204 stores programming instructions for execution by the one or more processors 202. The programming instructions are executed by the one or more processors to determine a position based on the first phase voltage and the second phase voltage. Computing a Clarke transform and a Park transform are steps used to determine the position. More details on the specific methods and algorithms to determine motor position are discussed later within this disclosure. The controller 120 includes an input/output module 206 that can be used to communicate with one or more aspects of the electronically boosted turbocharger system 100. For example, voltage signals from voltage sensors (132, 134) can be fed into the input/output module 206. In some implementations, the VSD 116 can be included within the same housing as the controller 120. In some implementations, the controller can send and/or receive signals from a VSD 116 that is separate from the controller 120.

Figure 3:
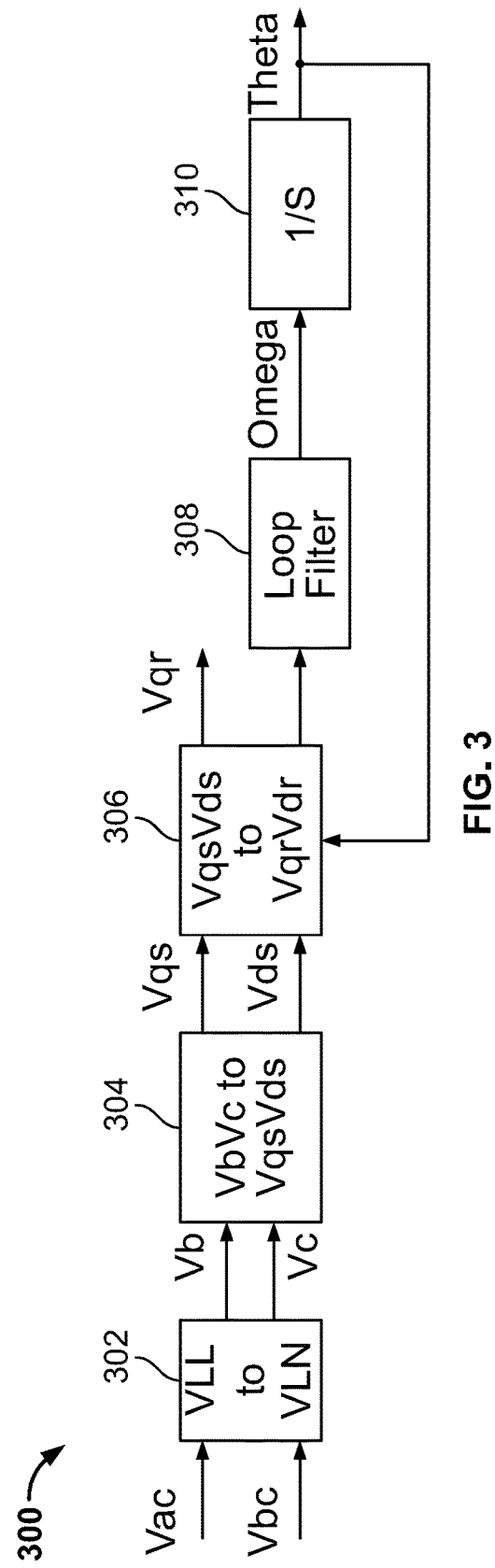
FIG. 3 is a block diagram of an example control-loop that can be used with aspects of this disclosure.

FIG. 3 is a block diagram of an example control loop 300 that can be used with aspects of this disclosure. At block 302, two line-to-line terminal voltages (such as phase A to C and phase B to C) are measured and calibrated with respective gain and offset. After being measured, the voltages are converted to line-neutral voltages ($V_b$, and $V_c$). It is assumed that all three phases are balanced. At block 304, Clarke's transformation is used to convert the variables from a three-phase system to a two-phase orthogonal system variables of $V_{ds}$ and $V_{qs}$ according to the following equations.

$$Vds = 1/\sqrt{3}(Vc - Vb) \qquad (EQ. 1)$$

$$V_{qs} = -(V_b + V_c) \qquad (EQ. 2)$$

Where $V_b$ is the first phase voltage, $V_c$ is the second phase voltage, $V_{ds}$ is a first orthogonal component, and $V_{qs}$ is a second orthogonal component.

At block 306, Park's transformation is used to convert the variables from a two-phase stationary frame to a two-phase rotating frame according to the following equations.

$$V_{qr} = V_{qs} \cos\theta - V_{ds} \sin\theta \qquad (EQ. 3)$$

$$V_{dr} = V_{qs} \sin\theta - V_{ds} \cos\theta \qquad (EQ. 4)$$

Where $V_{qr}$ is a first rotating frame reference voltage, $V_{dr}$ is second rotating frame reference voltage, and $\theta$ is the motor position. At block 308, a filter is applied to the voltage, and a motor speed is determined. At block 310, a phase lock loop (PLL) is used to generate the voltage phase angle (e.g. $\theta$, the motor position) by regulating the voltage $V_{dr}$ to zero. During this process, the VSD is in an off-state. That is, the VSD is not drawing power from the power supply 130.

Figure 4:
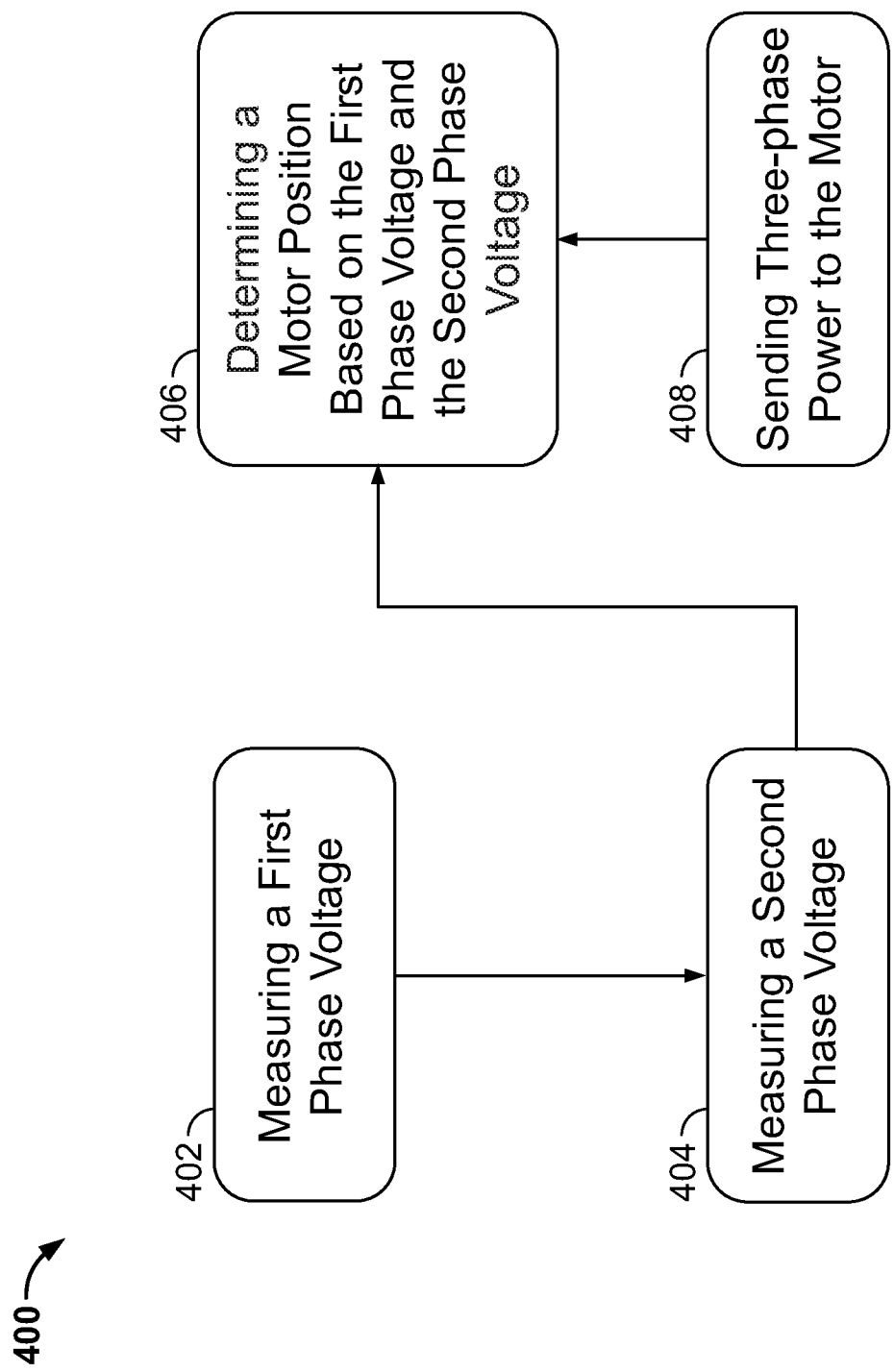
FIG. 4 is a flowchart of an example method that can be used with aspects of this disclosure.

FIG. 4 is a flowchart of an example method 400 that can be used with aspects of this disclosure. In some implementations, the method 400 can be implemented by a controller, for example, the controller 120 described with reference to FIG. 1. At 402, a first line-to-line terminal voltage of a three-phase electric motor is measured while the three-phase electric motor is allowed to free-spin. At 404, a second line-to-line terminal voltage of a three-phase electric motor is measured while the three-phase electric motor is allowed to free-spin. At 406, a motor position is determined based on the first line-to-line terminal voltage and the second line-to-line terminal voltage. Clarke transforms (EQ. 1-2) and Park transforms (EQ. 3-4) are used to determine the motor position. At 408, three-phase power is sent to the motor after the motor's rotor position has been determined. The three-phase power sent to the motor is in-phase with the rotor position. In some implementations, sending three-phase power to the motor includes approximating a sine wave with PWM. The three-phase power is used to accelerate the motor and turbocharger to a pre-set speed. Once the pre-set speed is reached, the motor is allowed to free-spin.

While this disclosure contains many specific implementation details, these should not be construed as limitations on the scope of what may be claimed, but rather as descriptions of features specific to particular implementations. Certain features that are described in this disclosure in the context of separate implementations can also be implemented in combination in a single embodiment. Conversely, various features that are described in the context of a single embodiment can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described components and systems can generally be integrated together in a single product or packaged into multiple products. For example, the electric motor 112 can be integrated into the turbocharger as a single unit.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An electric motor control system comprising;
a three-phase electric machine configured to drive or be driven by a rotating device;
a variable speed drive electrically coupled to the electrical machine, the variable speed drive configured to drive the electric machine with three phases of current;
a first voltage sensor configured to measure a first line-to-line terminal voltage of the three-phase electric machine while the three-phase electric machine free-spins;
a second voltage sensor configured to measure a second line-to-line terminal voltage of the three-phase electric machine while the three-phase electric machine free-spins; and
a controller configured to:
receive the first line-to-line terminal voltage and the second line-to-line terminal voltage,
determine rotor position of the three-phase electric machine, and
send three-phase power to the three-phase electric machine after the three-phase electric machine's rotor position has been determined, the three phase power being in-phase with the three-phase electric machine's rotor position.

2. The electric motor control system of claim 1, wherein the rotating device comprises a turbocharger.

3. The electric motor control system of claim 1, wherein the controller comprises:
one or more processors; and
a non-transitory computer-readable storage medium coupled to the one or more processors and storing programming instructions for execution by the one or more processors, the programming instructions executable by the one or more processors to:
determine the position based on the first line-to-line terminal voltage and the second line-to-line terminal voltage.

4. The electric motor control system of claim 3, wherein the programming instructions executable by the one or more processors to determine the position include instructions executable by the one or more processors to compute a Clarke transform and a Park transform.

5. The electric motor control system of claim 1, wherein the electric machine is a synchronous permanent magnet electric machine.

6. An electrically boosted turbocharger system comprising:
a turbocharger configured to increase an intake manifold pressure of an internal combustion engine, the turbocharger comprising:
a compressor configure to increase the intake manifold pressure; and
a turbine rotatably coupled to the compressor, the turbine configured to convert exhaust flow into rotational motion, the turbine configured to rotate the compressor;
a three-phase electric motor rotatably coupled to the turbocharger, the motor configured to accelerate the turbocharger to a pre-set speed;
a variable speed drive electrically coupled to the motor, the variable speed drive configured to drive the electric motor with three phases of current, the variable speed drive configured to exchange current with the electric motor when the electric motor is accelerating;
a first voltage sensor configured to measure a first line-to-line terminal voltage of the three-phase electric motor while the three-phase electric motor free-spins; and
a second voltage sensor configured to measure a second line-to-line terminal voltage of the three-phase electric motor while the three-phase electric motor free-spins.

7. The electrically boosted turbocharger system of claim 6, wherein the electric motor is directly coupled to the compressor.

8. The electrically boosted turbocharger system of claim 6, wherein the electric motor is a synchronous permanent magnet motor.

9. The electrically boosted turbocharger system claim 6, wherein the variable speed drive is configured to approximate a sine wave with pulse width modulation.

10. The electrically boosted turbocharger system of claim 6, further comprising a controller comprising:
   one or more processors; and
   a non-transitory computer-readable storage medium coupled to the one or more processors and storing programming instructions for execution by the one or more processors, the programming instructions executable by the one or more processors to:
      determine a motor's rotor position based on the first line-to-line terminal voltage or the second line-to-line terminal voltage.

11. The electrically boosted turbocharger system of claim 10, wherein the programming instructions to instruct the one or more processors to determine a motor's rotor position include computing a Clarke transform or a Park transform.

12. The electrically boosted turbocharger system of claim 11, wherein the variable speed drive is in an inactive state when the motor's rotor position is determined.

13. The electrically boosted turbocharger system of claim 6, wherein the electric motor is configured to free-spin once the turbocharger has reached the pre-set speed.

* * * * *

UNITED STATES PATENT AND TRADEMARK OFFICE
CERTIFICATE OF CORRECTION

PATENT NO. : 10,753,270 B2
APPLICATION NO. : 16/053326
DATED : August 25, 2020
INVENTOR(S) : Liping Zheng, Suratkal P. Shenoy and Co Si Huynh Page 1 of 1

It is certified that error appears in the above-identified patent and that said Letters Patent is hereby corrected as shown below:

In the Claims

In Column 9, Line 4, Claim 9, after "system" insert -- of --.

Signed and Sealed this
Nineteenth Day of January, 2021

Andrei Iancu
*Director of the United States Patent and Trademark Office*